Feb. 7, 1961 G. R. SIMPSON 2,970,515
PHOTOGRAPHIC PRINTING METHOD AND APPARATUS THEREFOR
Filed July 19, 1956 2 Sheets-Sheet 1

INVENTOR
GEORGE R. SIMPSON
BY
ATTORNEYS

Feb. 7, 1961 G. R. SIMPSON 2,970,515
PHOTOGRAPHIC PRINTING METHOD AND APPARATUS THEREFOR
Filed July 19, 1956 2 Sheets-Sheet 2

INVENTOR
GEORGE R. SIMPSON
BY Louis L. Gagnon
Robley S. Williams
ATTORNEYS

United States Patent Office 2,970,515
Patented Feb. 7, 1961

2,970,515

PHOTOGRAPHIC PRINTING METHOD AND APPARATUS THEREFOR

George R. Simpson, South Woodstock, Conn., assignor to American Optical Company, Southbridge, Mass., a voluntary association of Massachusetts Filed July 19, 1956, Ser. No. 598,810

7 Claims. (Cl. 88—24)

This invention relates to wide angle photography and cinematography. More particularly it relates to a method and apparatus for use in printing wide angle picture images on a posit.ve film from negative images on a first film which has been obtained by the use of a single distortion introducing wide angle camera.

More specifically, said printing method and apparatus of the present invention introduce into such picture images being cop.ed on positive film additional distortional characteristics in such a manner and amounts that the positive film images so obtained may thereafter be projected by a single substantially distortion free projector predeterminately located in a theater arrangement rearwardly of a relatively large audience area onto the concave side of a horizontally curved wide angle viewing screen of carefully controlled curvature and observed with nearly complete freedom from distortion by persons adjacent a predetermined optimum position within said audience area. This predetermined optimum position may be initially chosen as either the optical center of the threater arrangement (the point corresponding to the original location of the camera taking the wide angle picture and thus constituting the true center of perspective of the picture image on the screen) or alternatively and preferably a more nearly centrally located position from front to rear in the audience area a preselected distance rearwardly of said opt.cal center, the printing technique being adjusted accordingly. The projected screen image in either case will also give to a relatively large number of persons within a large preferred central portion of the audience area a comparatively high degree of freedom from image distortion.

It should be here noted the expression "wide angle" as used throughout the present descr.ption is intended to means that the object field as seen by the camera subtends in the horizontal direction thereof an angle ranging betewen approximately 90 and 160 degrees.

In copending O'Brien application, Serial No. 346,953, filed April 6, 1953, now U.S. Patent No. 2,857,805, there is disclosed a composite optical system and method for obtaining wide angle picture images comprehending an object field of similar horizontal angular value by means of a single distortion introducing wide angle camera lens system and for thereafter projecting a positive of same without modification onto a carefully horizontally curved viewing screen by means of a single distortion corrected projector from such a remote location and in such a way that persons near the optical center may observe a nearly distortion free screen image and a large number of people within an extended audience area surrounding this optical center may observe a fairly well corrected screen image in so far as these proportions and perspective are concerned. The advantages and desirabilit.es of such a wide angle system have been clearly set forth in said earlier application.

Even though the camera lens system of this earlier wide angle photographic and cinematographic system introduces a considerable amount of positive rad.al distortion and the horizontally curved viewing screen and projection distance employed therewith together compensate for most of this introduced distortion, slight amounts of distortion near the upper and lower side edge portions of the screen may remain, and while th.s slight upper and lower side edge distortion would ordinarily go unnoticed by the average observer, if an elongated vertically disposed object is present in the picture being displayed on the screen (for example a telephone pole or the corner of a tall building), the presence of such side edge distort.on may at times be sensed. Of course for most satisfactory results, this distortion should be eliminated and same is accomplished by the present invention.

In wide angle pictures of the type obtained by use of the system of said earlier copending application, lines near the upper and lower edges of the screen of horizontally extend.ng straight elongated objects in the photographed scenes may exhibit to the observer slight amounts of curvature on the curved screen while actually considerable amounts may be present therein, same having been introduced as radial d.stortion by the camera lens. Thus even though a certain amount of such top and bottom edge curvature may be highly desirable, extra amounts of such curvature should be eliminated. For example, the roof of a building or the like, may appear to curve downwardly at its opposite ends, and such distortion, if not properly reduced, may be quite objectionable. The method and apparatus of the present invention will also correct this distortion.

Also it is desirable in the case of certain conventional types of theater arrangements having two or more seating levels, to project onto the curved viewing screen from a position well above or well below the line of sight from the optical center of the audience area and thus introduce two or three additional distortions in the picture which should be cared for. The angle of declination or tilt being employed by the projection beam, for example, may be considerable with the result that the wide angle picture images upon the curved viewing screen when viewed along a line extending normally from the center of the screen may appear to "sag" or "droop" in the middle, and may also appear to possess some "keystone" effect at opposite side edges thereof. To persons below the normal this "sag or "droop" effect will look even worse. At times, also, depending upon the inclination of the line of sight from the optical center to the center of the screen, the desired amount of curvature of horizontal lines at the top and bottom of the screen image may differ from each other materially.

The printing method and apparatus of the present invention, however, enables wide angle distortion containing pictures of the type described above to be photographed on a first film and thereafter a positive or second film to be printed therefrom in such a way that substantially all of the above mentioned undesirable distortions will appear to be eliminated from the final projected picture image being viewed from the center of perspective or optimum position upon the curved viewing screen, and this is accomplished while allowing the picture image to be projected onto the screen by a single projector using a distortionless lens system and located at a position well to the rear of the center of the audience area and even well above or well below the audience level when desired. Thus the screen image will appear to persons near the optimum center of the audience area to be substantially free from distortion. Not only will most objects and persons in various parts of the wide angle screen image appear to be of proper sizes and proportions but also elongated vertical lines and the like near the side edges of the wide picture image upon the curved viewing screen will appear to be substantially free from distortion. Even extended upper and lower horizontal lines and the like which should appear straight will actually appear in this manner while manifesting substantially no "droop" or "keystone" effect in the screen image as seen from seats near this optimum position.

It is, accordingly, an object of the present invention to provide a photographic printing process and printing apparatus whereby wide angle pictures of the type being described herein and formed on a first or negative film, and each possessing controlled amounts of radial distortion introduced therein by a single wide lens system of the camera (or equivalent means), may be further modified by the provision of other controlled amounts of introduced distortion during the copying thereof upon a second or positive film, and in such a manner and in such amounts that the compensating characteristics of the viewing screen of proper predetermined curvature for use therewith and the preselected projection distance to be used therewith, will provide in the picture image being projected upon the viewing screen by a single distortion corrected projection lens system a picture which to persons near a preselected optimum position within the audience area will appear to be substantially free from distortion, including side edge distortion, top and bottom edge distortions, droop distortion, and keystone distortion.

Another object is to provide an arrangement for eliminating re-illumination of the screen surface which might result from light being reflected or scattered from one portion of the screen onto another portion thereof when an image is projected onto said screen and which might result in a deterioration or "washing out" effect of the image being photographed.

Another object is to provide a system of the character described with means whereby the image on the screen may be photographed without the projector employed in projecting the image on the screen being visible in the image as photographed by the camera.

It is an additional object of the present invention to provide printing apparatus in the form of an efficient, compact, self-contained device for carrying into effect the above mentioned process and which device may be easily moved to any suitable location and readily placed in operation at such location.

Other objects and advantages of the invention will become apparent from the detailed description which follows when taken in conjunction with the accompanying drawings in which.

Figure 1:
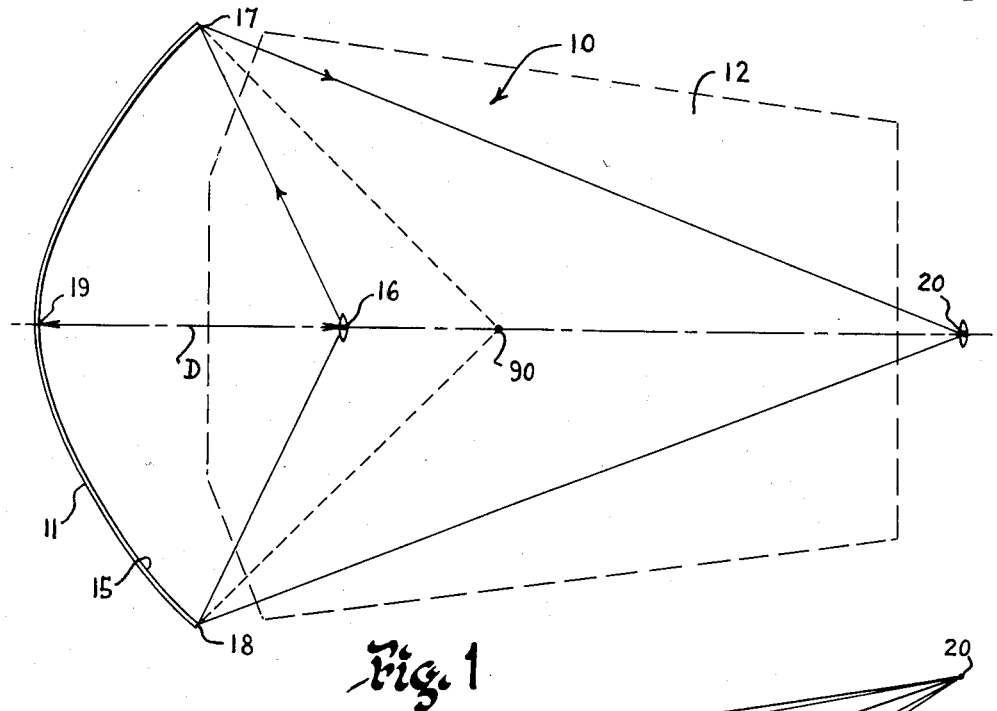
Fig. 1 is a diagrammatic plan view of an arrangement illustrating the essence of the invention.
Figure 2:
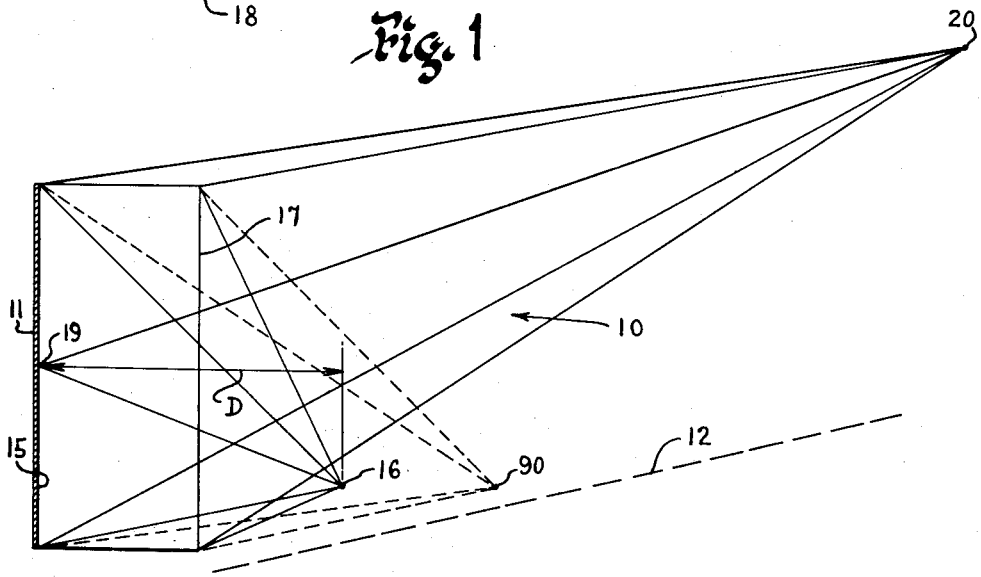
Fig. 2 is a longitudinal vertical sectional view of the arrangement of Fig. 1.

Referring to the drawings in detail, there is diagrammatically shown in Figs. 1 and 2 a plan and side sectional view respectively of a theater arrangement 10 comprising a wide angle viewing screen 11 disposed in front of an audience area indicated generally by the dash outline 12 of Fig. 1. The viewing screen intended for providing distortion-free screen pictures, it will be seen, is concavely curved in the transverse or horizontal direction thereof so as to provide a concave reflecting surface 15 of carefully controlled horizontal shape facing the audience area; and this shape has been predetermined in accordance with the wide angle included in the originally photographed scene to be displayed thereon, in accordance with the predetermined amount of introduced distortion contained in the photographic film image and in accordance with the projection distance to be employed when such a film is being projected from a preselected projection position onto said screen.

Let it be assumed that pictures have been originally taken by a camera having a wide angle lens system of the type disclosed in said earlier filed copending application Ser. No. 346,953 and that this lens system will cover an object field of approximately 130° while taking pictures having a controlled amount of inward radial distortion introduced therein. If such a camera and lens system were located at a suitable central point 16 in front of the concave surface 15, the wide angle object field of the camera would comprehend the entire screen width between the side edges 17 and 18.

Accordingly, if the distortion containing film image obtained from such a camera were thereafter projected from this point 16 back through the same lens system originally employed towards the viewing screen 11, or projected back towards the screen by other suitable optical means having substantially the same wide angle and image distorting characteristics as possessed by the camera lens system, a distortion free picture covering the entire width of the screen 11 would be provided. Regardless of the amount and type of distortion initially introduced into the negative film image, this distortion will be removed and the picture being displayed upon the screen will appear (in keeping with the well known optical principle of reversibility in lens systems) to persons near the point 16 to be free from distortion.

It therefore follows that to a person situated near the central point 16, a picture previously photographed by such a camera and being displayed upon the screen surface 15 by equivalent optical means will correspond completely in proportions and perspective to the original scene. Accordingly, we may conveniently refer to this point 16 as being the center of perspective of the picture being displayed, as well as to this point being the optical center of such a system. In such an arrangement a location adjacent this point 16 can be considered as a optimum location for witnessing such a projected picture. However, from the description which follows it will be appreciated that at times the optimum center and the effective center of perspective may not always coincide, and furthermore that the optical center may not be, under certain conditions, the optimum viewing location in the theater arrangement.

It is not desirable, as pointed out in said earlier filed application, to ordinarily employ a projector or projectors at such a central location in a motion picture theater arrangement for displaying a wide angle screen image and, accordingly, a system has been disclosed in said earlier filed application whereby a single projector may be located materially rearwardly of the optical center 16 as well as materially rearwardly of the center of the audience area 12 while providing such wide angle pictures. In practice it has been found preferable to have this projection distance equal to a value from two to five times the distance D from this optical center to the center 19 of the projection screen 11, and in the projection system indicated in Figs. 1 and 2 the position 20 from the screen 11 normally occupied by the projector has been selected as approximately equal to three times the distance D.

If the projector is disposed at the distance point and is projecting a controlled distortion-containing picture image towards the curved viewing screen 11 in the manner described in said earlier application people near the point 16 would observe upon the viewing screen a picture which, particularly along its horizontal meridian, appears to be well corrected for distortion. There may be contained, however, within such a positive or second film when same is merely copied from the original or negative film for projection purposes, in addition to the distortion which will be automatically removed by the screen of controlled curvature and by the use of a proper projection distance, slight amounts of side edge distortion and even small amounts of distortion near the upper and lower edges of the screen. While this side edge distortion is not ordinarily noticeable, it will become apparent at times when elongated vertical objects appear in the picture near the side edges of the screen. In like manner small amounts of distortion in elongated horizontal lines near the upper and lower edges may occasionally appear, and in both cases it may be desirable at times to eliminate same. Heretofore, special and exacting means and printing techniques have been required in order to eliminate or materially reduce these undesirable distortions while at the same time retaining the desired distortions which in effect laterally compress the picture horizontally on the opposed sides of the center thereof and enable such a wide angle picture to be contained in a narrower width of film than otherwise possible.

The present invention, accordingly, provides a novel printing process and improved printing apparatus for use with such a wide angle photographic and projection system as disclosed in said earlier application in such a way that the originally obtained laterally compressed distortion-containing negative film image may be reproduced upon a positive film in a manner which will retain said desired laterally compressed distortions therein for the system of said earlier application while simultaneously eliminating several undesired distortion previously mentioned.

Figure 3:
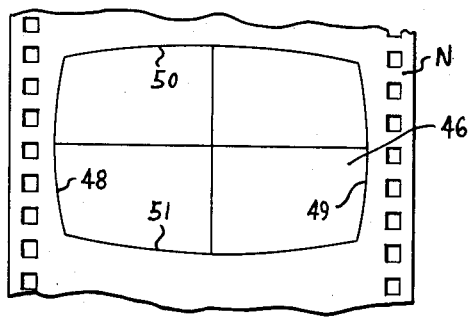
Fig. 3 is a diagrammatic showing of a distorted negative picture image for use in obtaining a better understanding of the invention.
Figure 4:
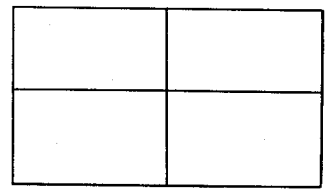
Fig. 4 is a diagrammatic showing of a wide angle picture image as it should appear projected upon the screen of Fig. 1 and viewed by a person located at the optical center of the associated audience area.
Figure 5:
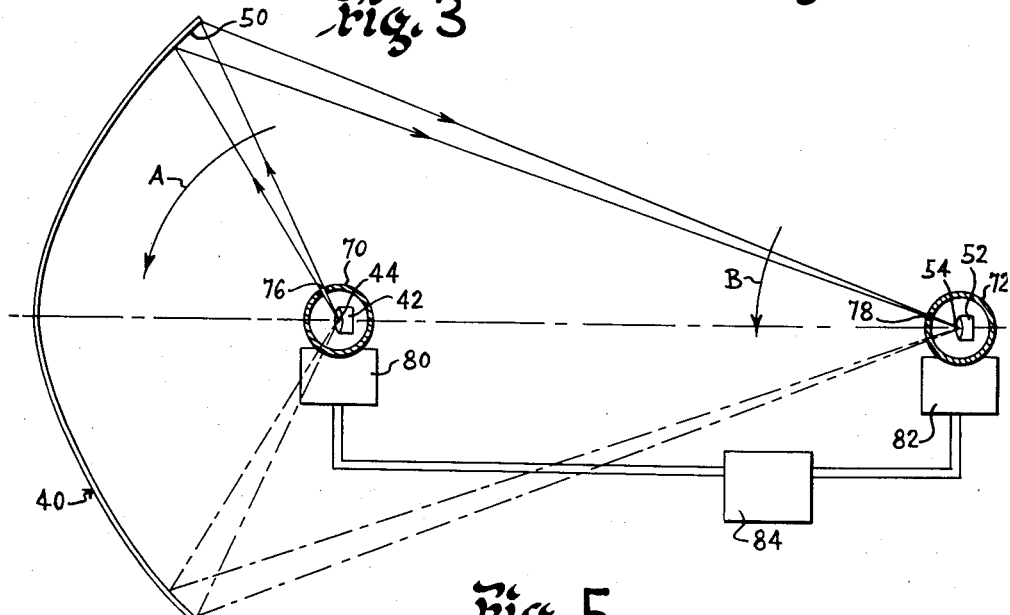
Fig. 5 is a plan view of a printing apparatus which may be used for carrying out the distortion printing process of the invention.

In Fig. 5, apparatus is shown for carrying out the novel process and this apparatus comprises a curved screen 40 which may be either of full size and similar to the screen 11 of Fig. 1 or accordingly ratioed down to a smaller scale model thereof. In either case a projector 42 with suitable lens means having optical characteristics like those of the original camera which photographed the scenes to be projected is disposed at a point 44 or point 16 in Figs. 1 and 2 in front of the concave surface of the screen which corresponds to the center of perspective of said original scenes. Let us assume a film image such as 46 (see Fig. 3) of an object such as shown in Fig. 4 is contained upon the negative film N and having somewhat the distorted shape indicated therein is positioned in the projector 42 and an image thereof projected and displayed upon the screen 40. The projection step because of the optical means employed in the projector being the same as the camera taking the film image 46, will in effect, direct all of the light rays therefrom back towards the sources from which they came originally and accordingly, regardless of the distortions recorded in the negative film image 46 these rays will strike the surface of the screen 40 so as to appear substantially free from distortion from point 44. Thus even though a slight curvature or distortion has been contained in the image 46 on the negative film N as indicated at the side edges 48 and 49 and less curvatures or distortions as indicated at the top and bottom edges 50 and 51 in this image which has been produced by the camera lens and materially transversely compressed, that is, in the horizontal direction thereof so as to have a desired gradually increasing amount of inward distortion towards the outer side edges resulting from the radial distortion characteristics of the camera lens originally employed will appear on the screen from the point 44 to be free from all distortion and of the shape of the original object as shown in Fig. 4. However, if the image on the screen is viewed from point 54 or point normally occupied by the theater projector an image having other undesirable distortions such as keystone and droop would be seen. Accordingly, if this screen image is photographed on a positive film in a camera 52 having a distortion free lens system or lens system similar to the lens system of the theater projector ultimately to be used in projecting the picture on the theater screen, and located at the point 54 corresponding to the theater projection position and distance to be later used during theater displaying of the pictures, the positive film would have a film image thereon embodying said keystone and droop distortions. Without attempting to describe the extent and specific nature of the distortions in the recorded positive film image other than to say such distortions would increase with increase of angle of projection and with increased screen curvature nevertheless, when such a positive film image is later projected from point 54 or theater projection point 20 onto a wide angle theater viewing screen 11 or other similar screen 40 of the same curvature and from the same angle and distance a distortion free picture will be observed from point 16 or 44.

The photographing of the image on the screen as seen at the theatre projecting position therefore introduces into the positive film image keystoning at the opposite side edges thereof and "sag" or "droop" distortion in the middle which, when thereafter projected from said theatre projecting position, will be such as to produce images on the screen which, when viewed from the optical center of the theatre or center of perspective, will appear corrected and distortion-free even though the picture image as seen on the film will have a peculiar distorted appearance. It is further pointed out when said pictures on the screen are viewed from locations in the theatre area other than the optical center or center of perspective 16 or 44 they still will appear well corrected or, we might say, the distortions in said screen picture will still be within tolerable limits.

While the projector for projecting the negative picture on the screen, as shown in Figs. 1 and 5, is described as being located at the centers of perspective 16 or 44, respectively, it may in some instances be desired to provide a rectified image from a so-called 50% viewing position in the center of the theatre area as indicated at 90, in Fig. 1, as this will present a more uniformly balanced picture correction to a greater percentage of individuals in the audience area. In order to accomplish this the system of rectification, as outlined above, will have to be somewhat modified. One method of accomplishing this result would be to locate the projector which projects the negative film image onto the screen at point 90 and to photograph the resultant image on the screen with a camera located at point 20. In this instance, there may be some slight curvature of the horizontal upper and lower edges of the positive picture image resulting therefrom. This curvature of horizontal lines or upper and lower edges of the picture image could thereafter be corrected through the use of a printing technique such as described in O'Brien et al. co-pending application, Serial No. 368,114, filed July 15, 1953, now U.S. Patent No. 2,786,388, wherein during the printing of the final film image the upper and lower edges of the film image could be so rectified as to appear relatively straight to individuals seated at or adjacent the 50% viewing position 90.

Another manner of reducing this type of distortional error would be to provide a narrowed angle photographic lens to be used at the 50% position as the printer projector lens which, while introducing the desired progressively changing lateral compressions in the image along the horizontal meridian thereof, as defined in the first-mentioned co-pending O'Brien application, Serial No. 346,953, filed August 6, 1953, now U.S. Patent No. 2,857,805, would reduce the above mentioned curvature distortions of the upper and lower edges of the picture image.

An objection to the above arrangements, however, may arise from the fact that the illuminated image being projected from the printing projector 42 onto all parts of the concavely curved screen 40 may cause certain illuminated parts of the screen surface to reilluminate other parts of the screen and cause a deterioration or a "washing out" effect of the image at said other parts of the screen. For example, an outer side surface portion of the screen may reflect or scatter light to other surface areas of the screen with the result that an inferior image would be obtained by the camera 52 positioned at point 54 for taking pictures on said screen. In order to prevent such an undesirable reillumination a first rotatable cylindrical drum 70 is provided about the projector 42 and a second similar rotatable drum 72 is positioned about the camera 52. Both drums are formed of opaque material and are provided with vertical slits 76 and 78 of a length to span the screen vertically and of controlled widths. The rotation of the drums are so controlled as to cause them to simultaneously face the same narrow vertical strip portions of the screen. These drums may be rotated by suitable means such as Selsyn motors 80 and 82 respectively which are operatively connected to and controlled by a controller 84 of known construction to impart proper speeds of rotation to each to bring about the above result. A narrow vertically extending area, as indicated adjacent one edge of the screen at 50, will be illuminated by a narrow vertical beam of light passing outwardly and producing a partial image through the slit 76 and this vertical beam of light and image portion impinging upon the screen will be simultaneously exposed through the slit 78 to the camera 52. As the narrow vertical beam of light at 50 is swept horizontally across the surface of the screen 40, by the slit 76 as indicated by the arrow A, this vertically illuminated area of the screen will be simultaneously swept by the slit 78 in drum 72 as indicated by the arrow B. This causes portions of the image to be progressively projected onto the screen and simultaneously progressively exposes the positive film to said image portions throughout the entire width of the image to be produced. The film, of course, remains stationary throughout said exposure and is intermittently advanced for each successive exposure. In this manner any stray light which is reflected from the narrow vertically illuminated area of the screen and which may tend to illuminate other parts of the screen surface will be prevented from reaching the projector 42 and the camera 52 by the slitted drums 70 and 72 respectively and, accordingly, such stray light will have no detrimental effect upon the positive film being used in the camera. Of course, the narrow illuminated area of the screen will be of small width in comparison to the entire transverse dimension of the screen, although it should be appreciated the width of this slit is not critical as long as same is narrow enough to prevent any detrimental effect to the image being copied.

Figure 6:
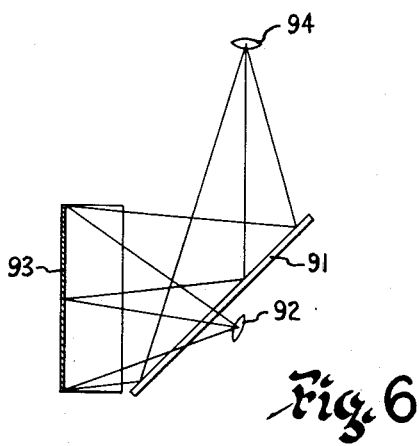
Fig. 6 is a diagrammatic side view of a modified form of the invention.

In some instances the related dispositions of the projector at point 16 and the camera at point 20 may be such as to cause the projector to be within the photographic field of the camera and such an arrangement, therefore, would not be desirable as the resultant photographic image would not only include the image as projected onto the screen but would also include the projector itself. One method of overcoming this difficulty would be to position, as shown in Fig. 6, a reflex plate 91 located between the projector 92 and screen 93 as diagrammatically illustrated in Fig. 6, and angled so as to permit a camera located at 94 to photograph the image on the screen by reflection resulting from said reflex plate, the reflex plate being such as to permit the image to be projected therethrough onto the screen 93.

While the arrangements set forth above are for theatres wherein the projector is to be located above the audience area, it is to be understood that the same technique may be employed in theatre arrangements wherein the projector is located below the audience area, for example, so-called drive-in theatres. The printing in such instances would be accomplished through the use of a projector located at the center of perspective of the picture being projected onto the screen either in the plane of the audience area or above the audience area and the camera for photographing the images on the screen would be located at the position or point below the audience area from which the images would be ultimately projected onto the screen for viewing by said audience. The printing techniques would otherwise be the same as those set forth above and would automatically introduce the proper distortional corrections in the positive film images for correcting distortions of the screen images as viewed by individuals in the audience area.

Although the slit 76 has been defined as a narrow slit, it is to be understood that said slit may be broadened out to subtend an angle taking in perhaps either one-third or one-half the screen depending upon how much contrast you lose by reillumination.

Although the slit for controlling the width of the projected band of light has been described as being formed in a drum encircling the camera and projector, it is to be understood that the drums having the slits therein may be positioned in encircling relation with the film within the camera and projector in which instance, a more clearly defined slit image on the screen may be provided. This follows in that the closer the slit is located to the film, a more clearly defined slit image will result. It is further to be understood that the slit may be formed variable in width, if desired.

From the foregoing description, it will be seen that simple, efficient and economical means and method have been provided for accomplishing all of the objects and advantages of the invention.

Having described my invention, I claim:

1. Projection printing apparatus for use in producing a distortion-containing film image of a relatively wide angle scene with the distortional characteristics of said image being controlled so that same may be subsequently projected onto the concave side of a wide angle theater viewing screen of an appreciable predetermined horizontal concave curvature from a given projection position rearwardly of an optimum viewing position facing the concave side of said screen and viewed from said optimum viewing position as a nearly distortion-free screen image of said wide angle scene, said printing apparatus comprising a horizontally concavely curved copying screen of a preselected size and so shaped as to correspond substantially to the horizontal concavely curved shape of the theater projection screen onto which said distortion-containing film image is to be subsequently projected, a projector facing the concave side of said copying screen and positioned in such spaced relation thereto as to correspond substantially to the positional relation of said optimum viewing position in said theater relative to the viewing screen thereof, said projector having a lens system having distortional characteristics substantially like those of the camera initially employed for photographing said wide angle scene and including upon said copying screen an angular field substantially equal to that of said camera, a copying camera for photographing the image when projected onto said copying screen by said projector, said copying camera being disposed at a copying position rearwardly of the projector position and at a distance from the copying screen corresponding substantially to the given projection position to be used in said theater, said copying camera having a lens system having distortional characteristics substantially like those of the projection objective to be used in the theater for projecting said distortion-containing film image onto the concave side of said theater viewing screen, first movable opaque means disposed in said apparatus between said projector and said copying screen, and second movable opaque means disposed in said apparatus between said copying camera and said copying screen, each opaque means having a vertically arranged slit-like aperture formed therein, said slit-like apertures being of such sizes respectively as to expose at any given instant only vertically extending fractional portions of said copying screen to said projector and to said camera respectively, and actuating means connected to said first and second opaque means for effecting simultaneous movement of said first and second opaque means so as to cause said slit-like apertures to simultaneously scan across said copying screen from one side edge thereof to the other.

2. Projection printing apparatus for use in producing a distortion-containing film image of a relatively wide angle scene with the distortional characteristics of said image being controlled so that same may be subsequently obliquely projected from a given projection position onto the concave side of a wide angle theater viewing screen of an appreciable predetermined horizontal concave curvature and viewed from an optimum viewing position facing the concave side of said screen as a nearly distortion-free screen image of said wide angle scene, said oblique image projection being at a given vertical angle relative to a line extending perpendicularly from the center of said theater screen, said printing apparatus comprising a horizontally concavely curved copying screen of a preselected size and so shaped as to correspond substantially to the horizontal concavely curved shape of the theater projection screen onto which said distortion-containing film image is to be subsequently projected, a projector facing the concave side of said copying screen and positioned in such spaced relation thereto as to correspond substantially to the positional relation of said optimum viewing position in said theater relative to the viewing screen thereof, said projector having a lens system having distortional characteristics substantially like those of the camera initially employed for photographing said wide angle scene and including upon said copying screen an angular field substantially equal to that of said camera, a copying camera for photographing the image when projected onto said copying screen by said projector, said copying camera being disposed at a copying position at such a distance from said copying screen and at such a vertical angle relative thereto as to correspond substantially to the given projection position to be used in said theater, said copying camera having a lens system having distortional characteristics substantially like those of the projection objective to be subsequently used in the theater for projecting said distortion-containing film image onto the concave side of said theater viewing screen, first movable opaque means disposed in said apparatus between said projector and said copying screen, and second movable opaque means disposed in said apparatus between said copying camera and said copying screen, and each opaque means having a vertically arranged slit-like aperture formed therein, said slit-like apertures being of such sizes respectively as to expose at any given instant only vertically extending fractional portions of said copying screen to said projector and to said camera respectively, and actuating means connected to said first and second opaque means for effecting simultaneous movement of said first and second opaque means so as to cause said slit-like apertures to simultaneously scan across said copying screen from one side edge thereof to the other.

3. Projection printing apparatus for use in producing a distortion-containing film image of a relatively wide angle scene with the distortional characteristics of said image being controlled so that same may be subsequently obliquely projected onto the concave side of a wide angle theater viewing screen of an appreciable predetermined horizontal concave curvature from a given projection position materially rearwardly of an optimum viewing position facing the concave side of said screen, and viewed from said optimum viewing position as a nearly distortion-free screen image of said wide angle scene, said oblique image projection being at a given vertical angle relative to a line extending perpendicularly from the center of said theater screen, said printing apparatus comprising a horizontally concavely curved copying screen of a preselected size and so shaped as to correspond substantially to the horizontal concavely curved shape of the theater projection screen onto which said distortion-containing film image is to be subsequently projected, a projector facing the concave side of said copying screen and positioned in such spaced relation thereto as to correspond substantially to the positional relation of said optimum viewing position in said theater relative to the viewing screen thereof, said projector having a lens system having distortional characteristics substantially like those of the camera initially employed for photographing said wide angle scene and including upon said copying screen an angular field substantially equal to that of said camera, a copying camera for photographing the image when projected onto said copying screen by said projector, said copying camera being disposed at a copying position at such a distance from said copying screen and at such a vertical angle relative thereto as to correspond substantially to the given projection position to be used in said theater, said copying camera having a lens system having distortional characteristics substantially like those of the projection objective to be subsequently used in the theater for projecting said distortion-containing film image onto the concave side of said theater viewing screen, first movable opaque means disposed in said apparatus between said projector and said copying screen, and second movable opaque means disposed in said system between said copying camera and said reflective screen, and each opaque means having a vertically arranged slit-like aperture formed therein, said slit-like aperatures being of such sizes respectively, as to expose at any given instant only vertically extending fractional portions of said copying screen to said projector and to said camera respectively, and actuating mean connected to said first and second opaque means for effecting simultaneous movement of said first and second opaque means so as to cause said slit-like apertures to simultaneously scan across said copying screen from one side edge thereof to the other.

4. Projection printing apparatus for use in producing a distortion-containing film image of a relatively wide angle scene with the distortional characteristics of said image being controlled so that same may be subsequently projected onto the concave side of a wide angle theater viewing screen of an appreciable predetermined horizontal concave curvature from a given projection position rearwardly of an optimum viewing position facing the concave side of said screen and viewed from said optimum viewing position as a nearly distortion-free screen image of said wide angle scene, said printing apparatus comprising a horizontally concavely curved copying screen of a preselected size and so shaped as to correspond substantially to the horizontal concavely curved shape of the theater projection screen onto which said distortion-containing film image is to be subsequently projected, a projector facing the concave side of said copying screen and positioned in such spaced relation thereto as to correspond substantially to the positional relation of said optimum viewing position in said theater relative to the viewing screen thereof, said projector having a lens system having distortional characteristics substantially like those of the camera initially employed for photographing said wide angle scene and including upon said copying screen an angular field substantially equal to that of said camera, a copying camera for photographing the image when projected onto said copying screen by said projector, said copying camera being disposed at a copying position on the concave side of said copying screen an operative distance corresponding substantially to the given projection distance to be used in said theater, said copying camera having a lens system having distortional characteristics substantially like those of the projection objective to be used in the theater for projecting said distortion-containing film image onto the concave side of said theater viewing screen, means for directing light from said copying screen to said copying camera including a semi-transparent reflecting element interposed between said projector and said copying screen, first movable opaque means disposed in said apparatus between said projector and said copying screen, and second movable opaque means disposed in said apparatus between said copying camera and said copying screen, and each opaque means having a vertically arranged slit-like aperture formed therein, said slit-like apertures being of such sizes respectively as to expose at any given instant only vertically extending fractional portions of said copying screen to said projector and to said camera respectively, and actuating means connected to said first and second opaque means for effecting simultaneous movement of said first and second opaque means so as to cause said split-like apertures to simultaneously scan across said copying screen from one side edge thereof to the other.

5. The method of photographically producing a distortion-containing film image of a relatively wide angle scene with the distortional characteristics of said image being so controlled that same may be subsequently projected in conventional fashion from a given theater projection position and at a given angle of tilt onto the concave side of a wide angle theatre viewing screen of appreciable predetermined horizontal concave curvature and viewed from an optimum viewing position facing the concave side of said screen as a nearly distortion-free screen image, said method comprising positioning a first projector at a predetermined projector position in front of the concave side of a copying screen having shape characteristics substantially similar to those of said theater viewing screen, said first projector position being so spaced from said copying screen as to correspond approximately to the center of perspective of the photographed wide angle scene, said first projector having an objective having characteristics simulating substantially the optical characteristics of the camera objective employed for obtaining the photographed wide angle scene, positioning a copying camera at such a predetermined copying position so spaced relative to said copying screen and at such an angle of tilt relative thereto as to geometrically correspond to the position and angle of tilt to be used by the theater projector when subsequently projecting the distortion-containing film image obtained by the copying camera onto the theater viewing screen, optically projecting successive narrow vertically disposed strip-like portions of the photographed scene by said first projector onto said copying screen and simultaneously exposing the film in the copying camera to said strip-like portions of the projected image on said copying screen, whereby the resulting film image so obtained will be a distortion-containing film image which may be thereafter projected onto said wide angle theater screen and viewed as a nearly distortion-free picture.

6. The method of photographically producing a distortion-containing film image of a relatively wide angle scene with the distortional characteristics of said image being so controlled that same may be subsequently projected in conventional fashion from a given theater projection position and at a given angle of tilt onto the concave side of a wide angle theater viewing screen of appreciable predetermined horizontal concave curvature and viewed from an optimum viewing position facing the concave side of said screen as a nearly distortion-free screen image, said method comprising positioning a first projector at a predetermined projector position in front of the concave side of a copying screen having shape characteristics substantially similar to those of said theater viewing screen, said first projector position being so spaced from said copying screen as to correspond approximately to the center of perspective of the photographed wide angle scene, said first projector having an objective having characteristics simulating substantially the optical characteristics of the camera objective employed for obtaining the photographed wide angle scene, positioning a copying camera at such a predetermined copying position so spaced relative to said copying screen and at such an angle of tilt relative thereto as to geometrically correspond to the position and angle of tilt to be used by the theater projector when subsequently projecting the distortion-containing film image obtained by the copying camera onto the theater viewing screen, optically projecting successive narrow vertically disposed strip-like portions of the photographed scene by said first projector onto said copying screen, and simultaneously exposing corresponding parts of the film in the copying camera to said strip-like portions of the projected image on said copying screen, whereby the resulting film image so obtained will be a distortion-containing film image which may be thereafter projected onto said wide angle theater screen and viewed as a nearly distortion-free picture.

7. The method of photographically producing a distortion-containing film image of a relatively wide angle scene with the distortional characteristics of said image being so controlled that same may be subsequently projected in conventional fashion from a given theater projection position and at a given angle of tilt onto the concave side of a wide angle theater viewing screen of appreciable predetermined horizontal concave curvature and viewed from an optimum viewing position facing the concave side of said screen as a nearly distortion-free screen image, said method comprising positioning a first projector at a predetermined projector position in front of the concave side of a copying screen having shape characteristics substantially similar to those of said theater viewing screen, said first projector position being so spaced from said copying screen as to correspond approximately to the center of perspective of the photographed wide angle scene, said first projector having an objective having characteristics simulating substantially the optical characteristics of the camera objective employed for obtaining the photographed wide angle scene, positioning a copying camera at such a predetermined copying position so spaced relative to said copying screen and at such an angle of tilt relative thereto as to geometrically correspond to the position and angle of tilt to be used by the theater projector when subsequently projecting the distortion-containing film image obtained by the copying camera onto the theater viewing screen, optically projecting successive narrow vertically disposed strip-like portions of the photographed scene by said first projector onto said copying screen, and simultaneously exposing corresponding parts of the film in the copying camera to said strip-like portions of the projected image on said copying screen while shielding substantially all other parts of the film in the copying camera from exposure to said copying screen, whereby the resulting film image so obtained will be a distortion-containing film image which may be thereafter projected onto said wide angle theater screen and viewed as a nearly distortion-free picture.

(References on following page)

References Cited in the file of this patent

UNITED STATES PATENTS

| | | |
|---|---|---|
| 1,283,676 | Comstock et al. | Nov. 5, 1918 |
| 1,325,198 | Hochstetter | Dec. 16, 1919 |
| 1,399,396 | Nelson | Dec. 6, 1921 |
| 1,528,021 | Janzer | Mar. 3, 1925 |
| 1,808,743 | Barkelew | June 9, 1931 |
| 1,829,633 | Chretien | Oct. 27, 1931 |
| 1,829,634 | Chretien | Oct. 27, 1931 |
| 1,853,072 | Morioka | Apr. 12, 1932 |
| 1,898,905 | Seitz | Feb. 21, 1933 |
| 1,938,808 | Ceccarini | Dec. 12, 1933 |
| 2,051,526 | Jennings et al. | Aug. 18, 1936 |
| 2,076,103 | Thorner | Apr. 6, 1937 |
| 2,438,137 | Waller et al. | Mar. 23, 1948 |
| 2,650,517 | Falk | Sept. 1, 1953 |
| 2,720,813 | Cox | Oct. 18, 1955 |
| 2,782,699 | Vanderhooft | Feb. 26, 1957 |
| 2,786,388 | O'Brien et al. | Mar. 26, 1957 |
| 2,795,996 | Sauer | June 18, 1957 |

FOREIGN PATENTS

| | | |
|---|---|---|
| 299,734 | Great Britain | Oct. 29, 1928 |